US012142887B2

(12) United States Patent
Zhou et al.

(10) Patent No.: US 12,142,887 B2
(45) Date of Patent: Nov. 12, 2024

(54) CABLE CRIMP HEAD

(71) Applicant: Ridge Tool Company, Elyria, OH (US)

(72) Inventors: Qi Zhou, Shanghai (CN); Jinan Chen, Shanghai (CN)

(73) Assignee: Ridge Tool Company, Elyria, OH (US)

(*) Notice: Subject to any disclaimer, the term of this patent is extended or adjusted under 35 U.S.C. 154(b) by 479 days.

(21) Appl. No.: 17/625,386

(22) PCT Filed: May 21, 2020

(86) PCT No.: PCT/US2020/033910
§ 371 (c)(1),
(2) Date: Jan. 7, 2022

(87) PCT Pub. No.: WO2021/006960
PCT Pub. Date: Jan. 14, 2021

(65) Prior Publication Data

US 2022/0271487 A1 Aug. 25, 2022

(30) Foreign Application Priority Data

Jul. 9, 2019 (CN) ......................... 201921067119.5

(51) Int. Cl.
*H01R 43/042* (2006.01)

(52) U.S. Cl.
CPC ................................ *H01R 43/0427* (2013.01)

(58) Field of Classification Search
CPC . H01R 43/0427; H01R 43/042; H01R 43/048
See application file for complete search history.

(56) References Cited

U.S. PATENT DOCUMENTS 3,554,000 A 1/1971 Schwab
3,862,482 A 1/1975 Medio
4,292,833 A * 10/1981 Lapp ........................ H02G 1/00 72/416
5,062,290 A * 11/1991 Hoover .............. H01R 43/0427 100/231
2017/0302044 A1* 10/2017 Lefavour .............. B23P 11/005

FOREIGN PATENT DOCUMENTS

JP 2018073589 5/2018

* cited by examiner

*Primary Examiner* — Teresa M Ekiert
(74) *Attorney, Agent, or Firm* — Erik J. Overberger; RANKIN, HILL & CLARK LLP

(57) ABSTRACT

The present disclosure relates to a crimper body and a crimper. The crimper body is applied to the crimper for crimping cables. The crimper body includes a body, which includes a fixed mold holder provided at one end of an upper portion of the body, and a protector. The protector is mounted to the body to reinforce and fix the fixed mold holder to rest of the body over the entire length of the fixed mold holder. The present disclosure further relates to the crimper including the crimper body. The crimper can effectively prevent fragments of the crimper body from dispersing when broken, and has the advantages of compact structure, light weight, and low cost.

17 Claims, 4 Drawing Sheets

CABLE CRIMP HEAD

CROSS REFERENCES TO RELATED APPLICATIONS

This application claims priority from Chinese application No. 201921067119.5 filed on Jul. 9, 2019.

FIELD

The present disclosure relates to a crimper body for crimping cables and a crimper including the crimper body.

BACKGROUND

At present, C-shaped crimpers are generally used to crimp cables in the power industry. A structure of a C-shaped crimper is shown in FIG. 1. The C-shaped crimper 1 includes a crimper body 2, a movable mold holder 3 and a power device 4. The power device 4 may be a hydraulic device (as shown in FIG. 1), a pneumatic device, a manual device, or an electric device that generates power. The movable mold holder 3 is provided inside the crimper body 2, and the crimper body 2 and the movable mold holder 3 together form a C-shaped opening. A mold (not shown) matching the shape of the cable to be crimped may be arranged between the crimper body 2 and the movable mold holder 3. The power device 4 provides thrust to move the movable mold holder 3 toward the crimper body 2 to crimp the cable in the mold located between the crimper body 2 and the movable mold holder 3. The crimper body 2 can withstand pressures up to ten tons. However, since the crimper body 2 is subjected to a relatively large pressure, the crimper body 2 may fracture.

In order to reduce potential for fragmentation of the crimper body, it would be desirable to increase the strength of the crimper body. The current commonly used method for increasing the strength of the crimper body is to increase the material of the crimper body, that is, increase the volume and weight of the crimper body. However, this method can only increase the life of the crimper body to a certain extent and cannot completely avoid fracture of the crimper body. Moreover, this method will result in an increase in the volume and weight of the crimper body and an increase in manufacturing costs.

Therefore, there is a need for a crimper body that can effectively prevent fragmentation of the crimper body upon breaking and a crimper body that has a compact structure, a light weight, and a low cost.

SUMMARY

The difficulties and drawbacks associated with previous approaches are addressed in the present subject matter as follows.

In one aspect, the present subject matter provides a crimper body for a crimper for crimping cables. The crimper body comprises a body including a fixed mold holder at one end of the body. The crimper body also comprises a protector mounted to the body to reinforce and fix the fixed mold holder to the body along an entire length of the fixed mold holder.

In another aspect, the present subject matter provides a crimper for crimping cables. The crimper comprises a crimper body including (i) a body including a fixed mold holder at one end of the body, and (ii) a protector mounted to the body to reinforce and fix the fixed mold holder to the body along an entire length of the fixed mold holder.

In still another aspect, the present subject matter provides a crimper body comprising a body including a fixed mold holder defined at one end of the body, a connecting portion defined at another end of the body, and a transition portion extending between the fixed mold holder and the connecting portion. The crimper body also comprises a removable protector affixable to the body, the protector including an arm portion and an extension portion extending transversely from the arm portion.

In yet another aspect, the present subject matter provides in combination with a cable-crimping head, a bracket for supporting the cable-crimping head, wherein normal operation of the cable-crimping head subjects the head to a hydraulic crimping force of between about 1 to 20 tons. In addition, the cable-crimping head defines an underside surface. And, the bracket defines a pair of spaced-apart side walls configured and dimensioned relative to the underside surface. And, the spaced-apart sidewalls contact the underside surface of the cable-crimping head, for preventing propagation of a crack in the cable crimping head.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

The features and advantages of one or more embodiments of the present disclosure will become more readily understood from the following description made with reference to the accompanying drawings in which.

DETAILED DESCRIPTION OF THE EMBODIMENTS

Figure 1:
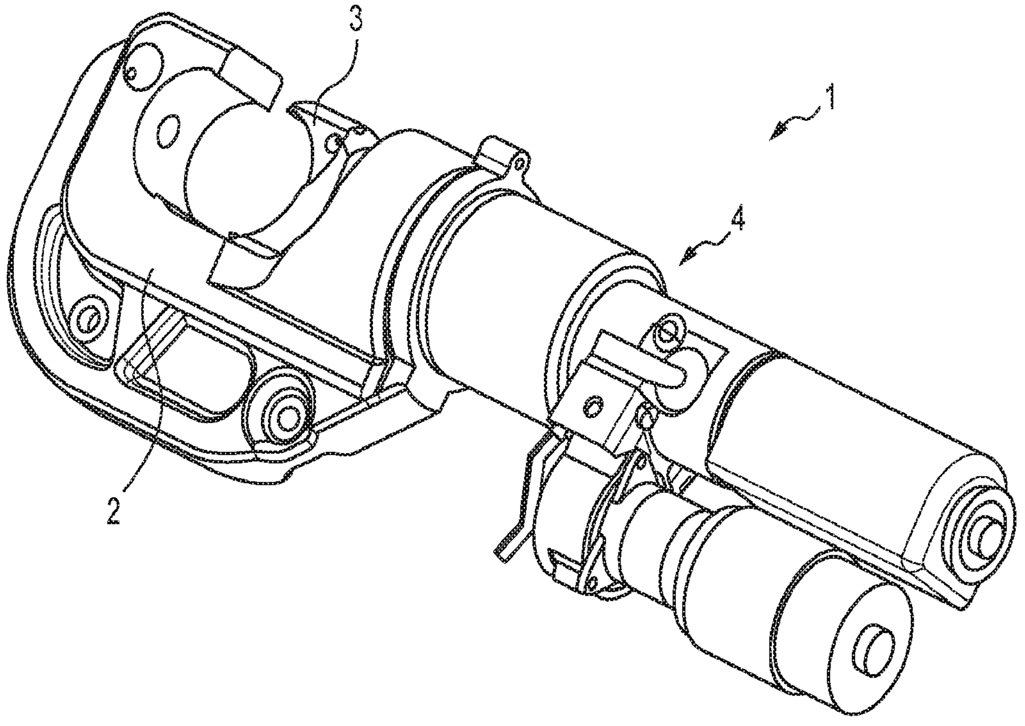
FIG. 1 is a perspective view of a crimper according to the prior art.

An object of one or more embodiments of the present disclosure is to provide a crimper body that can effectively prevent fragmentation of the crimper body upon breaking and which crimper body has a compact structure, a light weight, and a low cost.

An object of one or more embodiments of the present disclosure is to provide a crimper having the crimper body.

According to one aspect of the present disclosure, a crimper body of a crimper for crimping cables is provided, and the crimper body includes: a body including a fixed mold holder provided at one end of the body; and a protector mounted to the body to reinforce and fix the fixed mold holder to the rest of the body over the entire length of the fixed mold holder. Since the protector of the crimper body reinforces and fixes the fixed mold holder to the rest of the body over the entire length of the fixed mold holder, the protector will hold the fragments at the moment when the fixed mold holder breaks to prevent the fragments from dispersing.

Preferably, the protector reinforces and fixes the fixed mold holder to the rest of the body around a side portion and/or a back portion of the body.

Preferably, the body further includes a connecting portion provided at another end of the body for connecting with the power device, a transition portion provided between the fixed mold holder and the connecting portion, and a reinforcing portion provided below the fixed mold holder, the transition portion and the connecting portion for increasing the strength of the body.

Preferably, the protector includes an arm portion and a fixing end portion arranged at an end of the arm portion and connected to the arm portion.

Preferably, the arm portion includes a vertical extension portion, and the length of the vertical extension portion is substantially equal to the length of the fixed mold holder, so that the vertical extension portion is fixed to a side portion of the fixed mold holder and/or to a back portion of the reinforcing portion over the entire length of the fixed mold holder.

Preferably, a through hole is provided at an end of the vertical extension portion, so that the vertical extension portion is fixed to a surface of the side portion of the fixed mold holder and/or to a surface of the back portion of the reinforcing portion by passing a fixing member through the through hole of the vertical extension portion.

Preferably, the arm portion further includes a horizontal extension portion perpendicular to the vertical extension portion, and the horizontal extension portion matches planes of side portions of the transition portion and the connecting portion in a horizontal direction.

Preferably, two arm portions are provided, and the two arm portions are parallel to each other.

Preferably, the arm portion further includes an intermediate portion provided between the vertical extension portion and the fixing end portion, and, the vertical extension portion and the intermediate portion match a surface of the entire back portion of the reinforcing portion.

Preferably, a through hole is provided in the center of the fixing end portion, so that the fixing end portion to an outer end surface of the connecting portion by passing a fixing member through the through hole. Preferably, the protector is sheet-shaped or chain-shaped.

Preferably, the protector is made of flexible metal or high-strength plastic.

According to one aspect of the present disclosure, a crimper for crimping cables is provided, and the crimper includes the crimper body.

Preferably, the crimper further includes: a movable mold holder, which can be mounted in the body of the crimper body to crimp a cable together with the fixed mold holder; a power device, which is configured to provide a thrust for the movable mold holder to push the movable mold holder toward the fixed mold holder.

The crimper body and the crimper including the crimper body of the present disclosure can effectively prevent fragments of the crimper body from dispersing when broken, and the crimper has the advantages of compact structure, light weight, and low cost.

The following description of the preferred embodiments is merely exemplary and is by no means intended to limit the present disclosure, its application or usage.

A crimper body 2 for a crimper according to the first embodiment of the present disclosure is described below with reference to FIGS. 2 and 3. The crimper body includes a body 10 and a protector or bracket 20 provided on the body 10.

Figure 2:
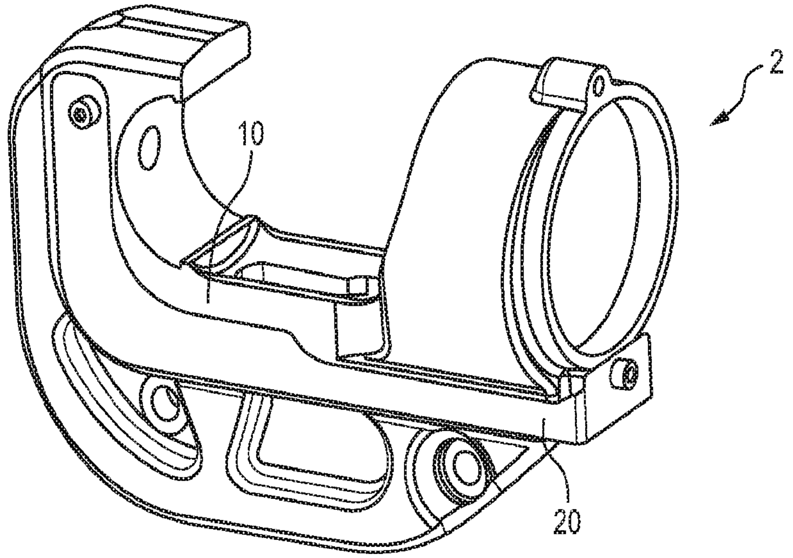
FIG. 2 is a perspective view of a crimper body for a crimper according to a first embodiment of the present disclosure.
Figure 3:
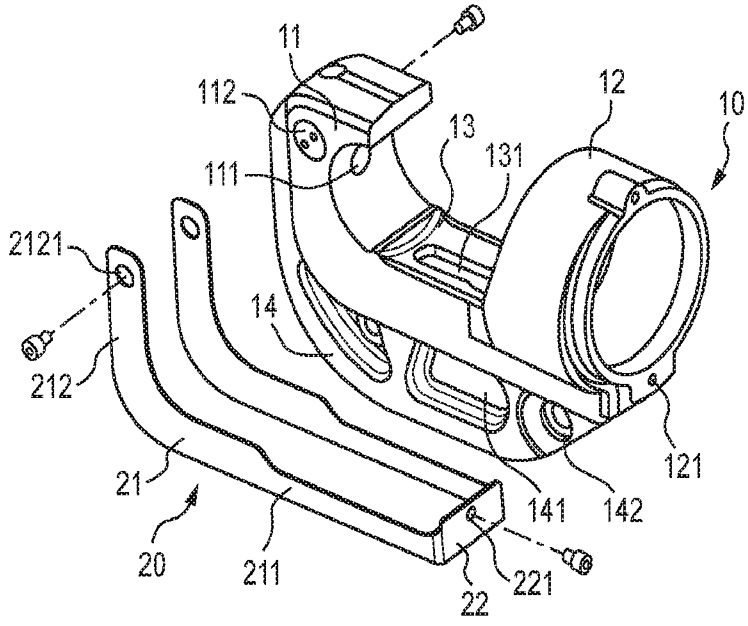
FIG. 3 is an exploded perspective view of the crimper body for a crimper according to the first embodiment of the present disclosure.

As can be seen from FIGS. 2 and 3, the body 10 includes a fixed mold holder 11, a connecting portion 12, and a transition portion 13 provided between the fixed mold holder 11 and the connecting portion 12, which are provided at an upper portion of the body. The fixed mold holder 11 is arranged at an end (shown as the left end in FIG. 2) of the upper portion of the body 10. The fixed mold holder 11 has an arc-shaped inner surface, and a through hole 111 is provided in the inner surface, so as to fix one half of the mold (not shown) matching the shape of the cable to be crimped into the fixed mold holder 11 by a fixing member passing through the through hole 111. Holes 112 for insertion of fixing members such as screws are further provided on two sides of the fixed mold holder 11. The connecting portion 12 is provided at another end of the upper portion of the body 10 (shown as the right end in FIG. 2). The connecting portion 12 is a cylindrical cavity for connecting with a power device (not shown). A hole 121 is further provided in a lower portion of the connecting portion 12. The transition portion 13 extending horizontally is provided between the upper portion of the body 10, the fixed mold holder 11 and the connecting portion 12. An elongated groove 131 extending horizontally toward the fixed mold holder 11 is provided in the middle of the transition portion 13, which allows a movable mold holder (not shown) of the other half of the installation mold to move horizontally toward the fixed mold holder 11. In addition, the body 10 further includes a reinforcing portion 14 provided at a lower portion of the body 10. The reinforcing portion 14 extends from the outside of an upper end portion of the fixed mold holder 11, through a lower portion of the transition portion 13, and to a lower portion of the connecting portion 12. The reinforcing portion 14 is configured to increase the strength of the fixed mold holder 11, the transition portion 13 and the connecting portion 12. The width of the reinforcing portion 14 is smaller than the width of any one of the fixed mold holder 11, the transition portion 13, and the connecting portion 12. A weight reduction groove 141 is provided in the middle of the reinforcing portion, and a through hole 142 for connecting with a strap is provided on two sides of the weight reduction groove 141.

As shown in FIGS. 2 and 3, the protector 20 is a sheet-shaped member (the sheet-shaped member herein refers to that the length and width of the member are much larger than the thickness of the member), and includes two arm portions 21 and a fixing end portion 22 located between the two arm portions. The two arm portions 21 are parallel to each other. Each arm portion 21 is L-shaped and includes a horizontal extension portion 211 and a vertical extension portion 212 perpendicular to each other. The width of the horizontal extension portion 211 is narrowed toward the fixing end portion 22 so that the horizontal extension portion 211 matches planes on two sides of the transition portion 13 and the connecting portion 12 in the horizontal direction. The length of the vertical extension portion 212 is substantially equal to the length of the fixed mold holder 11 (the length of the fixed mold holder 11 refers to the length of the fixed mold holder 11 in a vertical direction), and the vertical extension portion 212 matches planes on two sides of the fixed mold holder 11 in the vertical direction. A through hole 2121 is provided at an end of the vertical extension portion 212 so as to fix the two arm portions 21 to the two side of the fixed mold holder 11 over the entire length of the fixed mold holder 11 by inserting a fixing member such as a screw through the through hole 2121 into screw holes 112 on the two sides of the fixed mold holder 11. The fixing end portion 22 is perpendicular to the two arm portions 21 and connects the two arm portions 21. A through hole 221 is provided in the center of the fixing end portion 22 so as to fix the fixing end portion 22 of the protector 20 to an outer end face of the connecting portion 12 of the body 10 by inserting a fixing member such as a screw through the through hole 221 into the screw hole 121 of the connecting portion 12. Thus, the protector 20 reinforces and fixes the fixed mold holder 11 to the rest of the body 10 over the entire length of the fixed mold holder 11 around two sides of the body 10.

In many embodiments, the protector such as protector 20, is removable and/or separable from the body of the crimper. Thus, in such embodiments, the protector is not integrally formed with the body of the crimper. The removable and/or separable protector can be attached, affixed, and/or otherwise mounted to the body of the crimper using a wide array of components and techniques such as those described herein. Typically, the protector is attached along one or more underside surface(s) of the body of the crimper. These surface(s) are generally defined alongside or oppositely directed from the C-shaped opening of the crimper or crimper body.

Preferably, the protector 20 is made of a high-strength elastic material. Preferably, the protector 20 is made of flexible metal or high-strength plastic.

When the crimper body 2 reaches its life limit due to repeated use of the crimper including the crimper body according to the present disclosure for crimping cables, the fixed mold holder 11 of the crimper body 2 may break from the body 10 due to the huge pressure of more than ten tons over its entire length, and the fixed mold holder 11 may break into pieces and fragment outward at the moment of breaking. Since the protector 20 of the crimper body 2 according to the present disclosure reinforces and fixes the fixed mold holder 11 to the rest of the body 10 over the entire length of the fixed mold holder 11, the protector 20 will hold the fragments from two sides at the moment when the fixed mold holder 11 breaks to prevent dispersal of fragments. Moreover, since the protector 20 is small in size and light in weight, mounting the protector 20 to the body 10 does not cause a significant increase in the size and weight of the entire crimper body 2, thereby maintaining the compact structure, light weight and lower cost of the crimper body 2.

Figure 4:
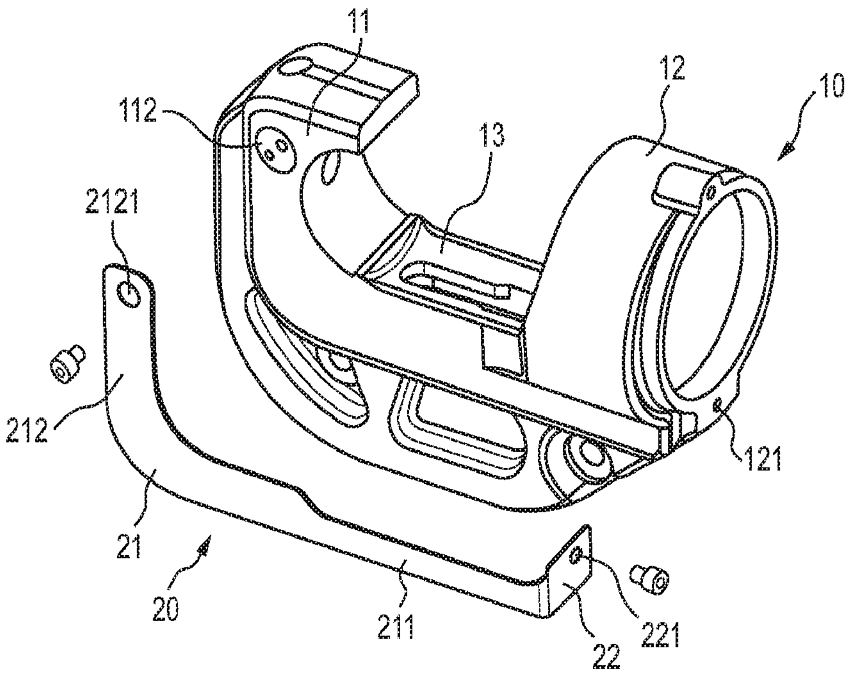
FIG. 4 is an exploded perspective view of the crimper body for a crimper according to a second embodiment of the present disclosure.

A crimper body for a crimper according to the second embodiment of the present disclosure is described below with reference to FIG. 4. The crimper body includes a body 10 and a protector 20. The body 10 includes a fixed mold holder 11, a connecting portion 12, and a transition portion 13 provided between the fixed mold holder 11 and the connecting portion 12, which are provided at an upper portion of the body. The structure of each part of the body 10 is the same as that in the first embodiment. The protector 20 is a sheet-shaped member (the sheet-shaped member herein refers to that the length and width of the member are much larger than the thickness of the member), and includes one arm portion 21 and a fixing end portion 22. The arm portion 21 is L-shaped and includes a horizontal extension portion 211 and a vertical extension portion 212 perpendicular to each other. The width of the horizontal extension portion 211 is narrowed toward the fixing end portion 22 so that the horizontal extension portion 211 matches a plane on one side of the transition portion 13 and the connecting portion 12 in a horizontal direction. The length of the vertical extension portion 212 is substantially equal to the length of the fixed mold holder 11 (the length of the fixed mold holder 11 refers to the length of the fixed mold holder 11 in a vertical direction), and the vertical extension portion 212 matches a plane on one side of the fixed mold holder 11 in the vertical direction. A through hole 2121 is provided at an end of the vertical extension portion 212 so as to fix the arm portion 21 to one side of the fixed mold holder 11 over the entire length of the fixed mold holder 11 by inserting a fixing member such as a screw through the through hole 2121 into a screw hole 112 on one side of the fixed mold holder 11. The fixing end portion 22 is perpendicular to the arm portion 21 and is connected with the arm portion 21. A through hole 221 is provided in the center of the fixing end portion 22 so as to fix the fixing end portion 22 of the protector 20 to an outer end face of the connecting portion 12 of the body 10 by inserting a fixing member such as a screw through the through hole 221 into a screw hole 121 of the connecting portion 12. Thus, the protector 20 reinforces and fixes the fixed mold holder 11 to the rest of the body 10 over the entire length of the fixed mold holder 11 around one side of the body 10.

Figure 5:
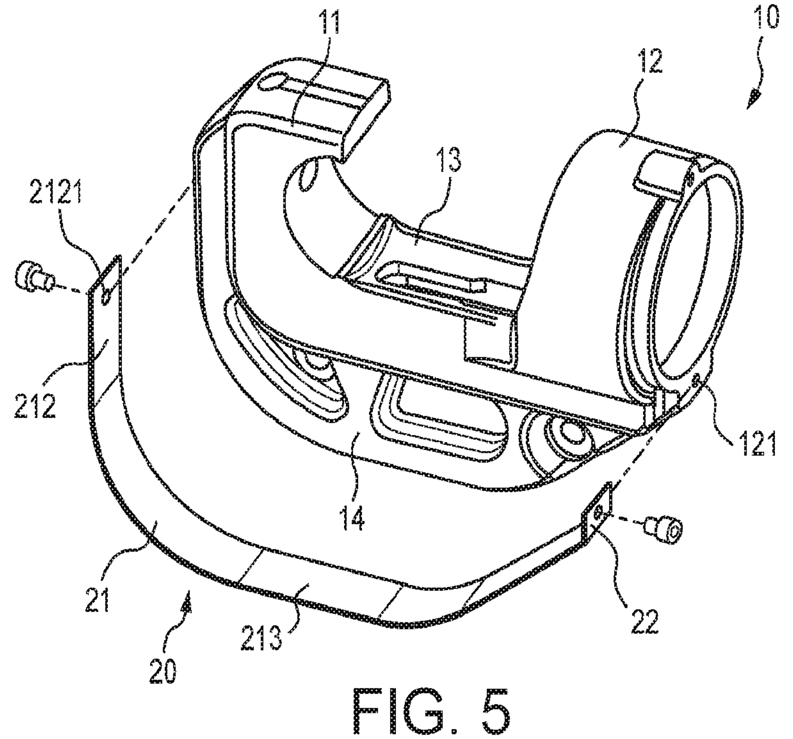
FIG. 5 is an exploded perspective view of the crimper body for a crimper according to a third embodiment of the present disclosure.

A crimper body for a crimper according to the third embodiment of the present disclosure is described below with reference to FIG. 5. The crimper body includes a body 10 and a protector 20. The body 10 includes a fixed mold holder 11, a connecting portion 12, and a transition portion 13 provided between the fixed mold holder 11 and the connecting portion 12, which are provided at an upper portion of the body, and further includes a reinforcing portion 14 provided at a lower portion of the body. The structure of each part of the body 10 is the same as that in the first embodiment. The protector 20 is a sheet-shaped member (the sheet-shaped member herein refers to that the length and width of the member are much larger than the thickness of the member), and includes one arm portion 21 and a fixing end portion 22 connected to the arm portion 21. The arm portion 21 includes a vertical extension portion 212 and an arc-shaped intermediate portion 213 provided between the vertical extension portion 212 and the fixing end portion 22. The vertical extension portion 212 and the intermediate portion 213 match the entire back surface of the reinforcing portion 14, and the length of the vertical extension portion 212 is substantially equal to the length of the fixed mold holder 11 (the length of the fixed mold holder 11 refers to the length of the fixed mold holder 11 in a vertical direction). A through hole 2121 is provided at an end of the vertical extension portion 212 so as to fix the arm portion 21 to the back surface of the reinforcing portion 14 over the entire length of the fixed mold holder 11 by inserting a fixing member such as a screw through the through hole 2121 into a screw hole (not shown) on the top of the back of reinforcing portion 14. A through hole 221 is provided in the center of the fixing end portion 22 so as to fix the fixing end portion 22 of the protector 20 to an outer end face of the connecting portion 12 of the body 10 by inserting a fixing member such as a screw through the through hole 221 into a screw hole 121 of the connecting portion 12. Thus, the protector 20 reinforces and fixes the fixed mold holder 11 to the rest of the body 10 over the entire length of the fixed mold holder 11 around the back of the body 10.

In addition, the protector 20 may be chain-shaped or sheet-shaped. In certain versions, the protector is formed from sheet metal and sized and shaped as described herein.

In addition, the protector 20 of the crimper body 2 according to the present disclosure may be a member of any shape that reinforces and fixes the fixed mold holder 11 to the rest of the body 10 over the entire length of the fixed mold holder 11. For example, the protector 20 may form a housing covering the fixed mold holder 11 at one end of the protector fixed to the fixed mold holder 11 to reinforce and fix the fixed mold holder 11 to the rest of the body 10 over the entire length of the fixed mold holder 11.

Figure 6:
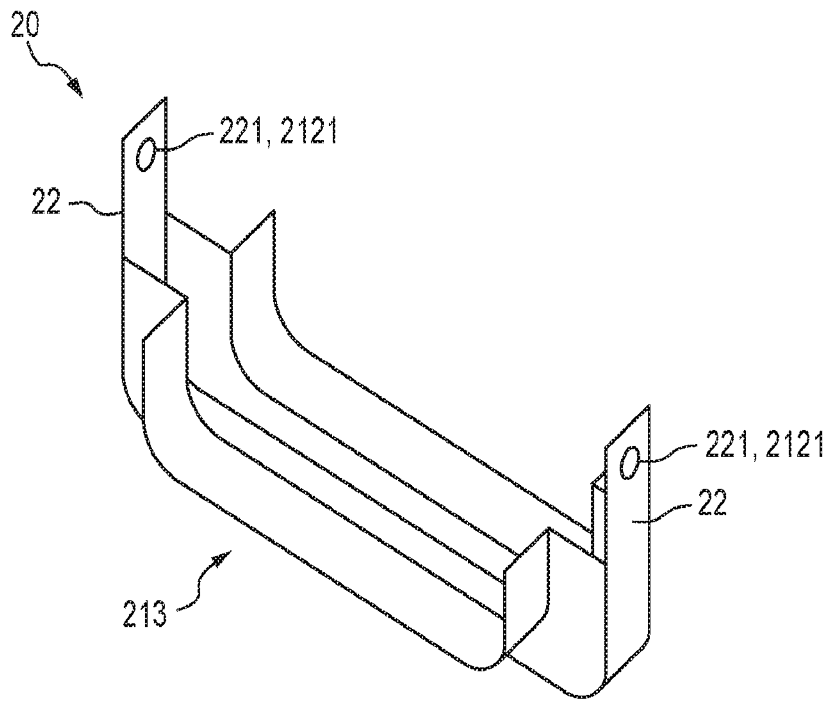
FIG. 6 is a perspective view of another embodiment of a protector for a crimper body.
Figure 7:
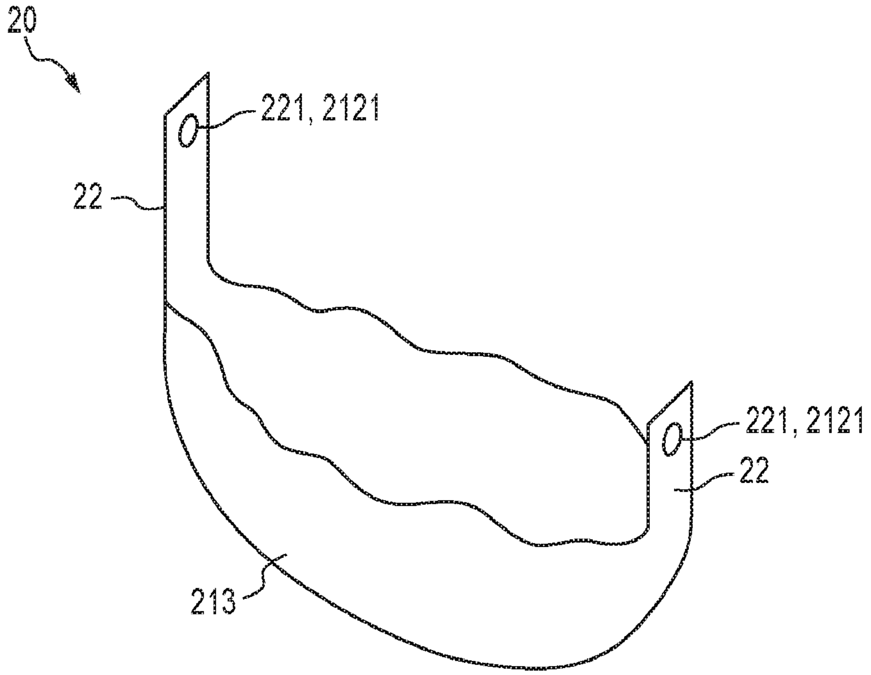
FIG. 7 is a perspective view of yet another embodiment of a protector for a crimper body.

FIGS. 6 and 7 illustrate additional embodiments of the protector 20. FIGS. 6 and 7 depict a protector 2 with opposite fixing end portions 22 and an intermediate portion 213 extending therebetween. Through holes 221, 2121 are provided in each of the end portions 22 for receiving screws or fasteners to affix the protector 20 to a crimper body as described herein. The protector 20 of FIG. 6 is formed from a relatively rigid and shape-retaining material and exhibits a geometry and/or configuration adapted to fittingly receive and/or contact the external surface of the crimper body. The protector 20 of FIG. 7 is formed from a flexible material and/or can be in a mesh-form. Upon positioning the protector 20 about a crimper body, the flexible material conforms to and adopts the outer geometry or shape of the crimper body.

The crimper body according to the present disclosure may be combined with various different power devices such as hydraulic, pneumatic, manual or electric power devices to form various crimpers driven by different powers. In addition, a movable mold holder may further be installed in the crimper body according to the present disclosure, and the movable mold holder is configured to be pushed toward the fixed mold holder of the crimper body by the power device to crimp the cable together with the fixed mold holder. The crimper as described above can effectively prevent fragments of the crimper body from fragmenting when broken, and has a compact structure, a light weight, and a low cost.

In many embodiments, the protector or bracket is used in combination with a cable-crimping head such as the crimp body 10. The cable-crimping head is particularly configured such that upon normal operation of the cable-crimping head for example upon connection with a power device, such as the previously noted power device 4, the cable-crimping head subjects the head to a hydraulic crimping force of between about 1 to 20 tons, and more particularly between about 6 to 7 tons. In certain applications, the cable-crimping head is formed from metals such as for example steel and/or titanium. Typically, in such embodiments the cable crimping head defines an underside surface as previously noted herein, and the protector or bracket defines a pair of spaced-apart side walls configured and dimensioned relative to the underside surface. Upon affixment or attachment of the protector to the cable-crimping head, the spaced-apart side-walls contact the underside surface. This configuration and arrangement prevents propagation of a crack or fracture in the cable crimping head. In many applications, the crack results from normal operation of the cable-crimping head over time. In certain versions, the cable-crimping head includes at least one aperture located for stopping propagation of a crack which, if not stopped, would result in fracture of the cable-crimping head.

While the various embodiments of the present disclosure have been described in detail herein, it is conceivable that the present disclosure is not limited to the specific embodiments described and illustrated herein in detail, and other variations and modifications can be made by the person skilled in the art without departing from the essence and scope of the present disclosure. All the variations and modifications are deemed to fall in the scope of the present disclosure. Moreover, all of the components described herein may be replaced by other technically equivalent components.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A crimper body for a crimper for crimping cables, the crimper body comprising:

a body including a fixed die holder at one end of the body and a connecting portion at another end of the body for connecting with a power device, a transition portion between the fixed die holder and the connecting portion, and a reinforcing portion below the fixed die holder, the transition portion and the connecting portion for increasing strength of the body; and a protector mounted to the body to reinforce and fix the fixed die holder to the body along an entire length of the fixed die holder, the protector including an arm portion and a fixing end portion arranged at an end of the arm portion and connected to the arm portion, wherein the protector is configured to reinforce and fix the fixed die holder to the body at a side portion and/or a back portion of the body;

wherein the arm portion includes a vertical extension portion, a length of the vertical extension portion being substantially equal to a length of the fixed die holder, and the vertical extension portion being fixed to a side portion of the fixed die holder and/or to a back portion of the reinforcing portion over the entire length of the fixed die holder, wherein a through hole is defined at an end of the vertical extension portion of the arm portion, and the vertical extension portion is fixed to a surface of the side portion of the fixed die holder and/or to a surface of the back portion of the reinforcing portion by a fixing member extending through the through hole of the vertical extension portion.

2. The crimper body according to claim 1, wherein the arm portion further includes a horizontal extension portion perpendicular to the vertical extension portion, and the horizontal extension portion matches planes of side portions of the transition portion and the connecting portion in a horizontal direction.

3. The crimper body according to claim 1, wherein the protector includes two arm portions, and the two arm portions are parallel to each other.

4. The crimper body according to claim 1, wherein the arm portion further includes an intermediate portion between the vertical extension portion and the fixing end portion, and the vertical extension portion and the intermediate portion match the surface of the entire back portion of the reinforcing portion.

5. The crimper body according to claim 1, wherein the protector is sheet-shaped or chain-shaped.

6. The crimper body according to claim 1, wherein the protector is made of flexible metal or high-strength plastic.

7. A crimper body for a crimper for crimping cables, the crimper body comprising:

a body including a fixed die holder at one end of the body and a connecting portion at another end of the body for connecting with a power device, a transition portion between the fixed die holder and the connecting portion, and a reinforcing portion below the fixed die holder, the transition portion and the connecting portion for increasing strength of the body; and a protector mounted to the body to reinforce and fix the fixed die holder to the body along a length of the fixed die holder, the protector including an arm portion and a fixing end portion arranged at an end of the arm portion and connected to the arm portion, wherein the protector is configured to reinforce and fix the fixed die holder to the body at a side portion and/or a back portion of the body;

wherein a through hole is defined in the center of the fixing end portion, and the fixing end portion is fixed to an outer end surface of the connecting portion by a fixing member extending through the through hole of the fixing end portion.

8. A crimper body for a crimper for crimping cables, the crimper body comprising:

a body including a fixed die holder at one end of the body; and a protector mounted to the body to reinforce and fix the fixed die holder to the body along a length of the fixed die holder;

wherein the protector is configured to reinforce and fix the fixed die holder to the body at a side portion and/or a back portion of the body;

wherein the body further includes a connecting portion at another end of the body for connecting with a power device, a transition portion between the fixed die holder and the connecting portion, and a reinforcing portion below the fixed die holder, the transition portion and the connecting portion for increasing strength of the body;

wherein the protector includes an arm portion and a fixing end portion arranged at an end of the arm portion and connected to the arm portion;

wherein a through hole is defined in the center of the fixing end portion, and the fixing end portion is fixed to an outer end surface of the connecting portion by a fixing member extending through the through hole of the fixing end portion.

9. The crimper body according to claim 8, wherein the arm portion includes a vertical extension portion, a length of the vertical extension portion being substantially equal to a length of the fixed die holder, and the vertical extension portion being fixed to a side portion of the fixed die holder and/or to a back portion of the reinforcing portion over the entire length of the fixed die holder.

10. The crimper body according to claim 9, wherein a through hole is defined at an end of the vertical extension portion of the arm portion, and the vertical extension portion is fixed to a surface of the side portion of the fixed die holder and/or to a surface of the back portion of the reinforcing portion by a fixing member extending through the through hole of the vertical extension portion.

11. The crimper body according to claim 9, wherein the arm portion further includes a horizontal extension portion perpendicular to the vertical extension portion, and the horizontal extension portion matches planes of side portions of the transition portion and the connecting portion in a horizontal direction.

12. The crimper body according to claim 11, wherein the protector includes two arm portions, and the two arm portions are parallel to each other.

13. The crimper body according to claim 9, wherein the arm portion further includes an intermediate portion between the vertical extension portion and the fixing end portion, and the vertical extension portion and the intermediate portion match the surface of the entire back portion of the reinforcing portion.

14. The crimper body according to claim 8, wherein the protector is sheet-shaped or chain-shaped.

15. The crimper body according to claim 8, wherein the protector is made of flexible metal or high-strength plastic.

16. The crimper body according to claim 8, wherein the protector is mounted to the body along an entire length of the fixed die holder.

17. The crimper body according to claim 16, further comprising:

a crimper including the crimper body, a movable die holder, which is mounted in the body of the crimper body to crimp a cable together with the fixed die holder; and a power device, which is configured to provide a force to the movable die holder to push the movable die holder toward the fixed die holder.

* * * * *